United States Patent [19]

Beal

[11] Patent Number: 4,679,802
[45] Date of Patent: Jul. 14, 1987

[54] CLAMP CHUCK

[76] Inventor: Loren D. Beal, 754 Penarth Ave., Walnut, Calif. 91789

[21] Appl. No.: 839,736

[22] Filed: Mar. 14, 1986

[51] Int. Cl.⁴ ............................................. B23B 31/10
[52] U.S. Cl. .................................. 279/106; 269/258; 279/1 B
[58] Field of Search .................. 269/93, 237, 258; 279/1 W, 106, 109, 1 R, 1 B, 1 N; 408/103, 104, 107

[56] References Cited

U.S. PATENT DOCUMENTS

| 1,691,657 | 11/1928 | Kempton | 279/1 R |
| 1,756,970 | 5/1930 | Booth | 279/1 R |
| 3,157,408 | 11/1964 | Mann | 279/106 |
| 3,365,206 | 1/1968 | Kohwart et al. | 279/106 |
| 3,420,538 | 1/1969 | Benjamin et al. | 279/106 |

FOREIGN PATENT DOCUMENTS 2037663 2/1972 Fed. Rep. of Germany .... 279/1 W

Primary Examiner—Eugene F. Desmond
Assistant Examiner—Daniel W. Howell
Attorney, Agent, or Firm—Boniard I. Brown

[57] ABSTRACT

A tool for holding a workpiece to be machined on a CNC lathe or other device which includes an integral or separately powered draw tube. The tool includes two rods which are spaced from but pivotally connected to the draw tube. The rods extend through a fixed tooling surface for releasable engagement with a clamping plate. When the rods are drawn in by movement of the draw tube, a properly positioned workpiece is retained between the tooling surface and the clamping plate for machining. Movement of the draw tube in the opposite direction releases the workpiece.

21 Claims, 9 Drawing Figures

CLAMP CHUCK

BACKGROUND OF THE INVENTION

Providing means for loading a workpiece, positioning and holding the workpiece during machining and unloading the workpiece when the machining is completed is a major problem with most repetitive machining operations. When a workpiece is properly positioned and held, it can be accurately machined. However, time spent in loading, aligning, clamping and otherwise orienting a part with respect to a machine tool, and unloading is time that is not available for the intended machining. A typical solution is to build costly, special one time jigs or fixtures. These are economical only when an extremely long production run is contemplated, and are inefficient when an expensive numerically controlled machine must be used for manufacturing many different parts in relatively short production runs where the cost of large inventories and work in process is excessive.

For certain kinds of machining, CNC lathes are very efficient in metal removal. For example, irregular parts requiring jig boring when done with milling machines, as is the usual case, take ten times longer to machine than when done on a lathe, as lathes are one of the fastest metal removal machines known. Unfortunately, irregular workpieces are difficult to chuck up in a normal lathe so that saved machining time may be expended in excessive loading and unloading time, or costs saved in machining are more than spent in the manufacturing costs of chucking fixtures.

It is economically desirable to keep a machine operator busy all the time. Therefore, if the machining can be accomplished in the time it takes the operator to stack a finished part and ready the next part for machining, the machine and man can operate as a team for the most economical manufacturing. In the past, the only way to get such efficiency out of a man/machine team in slow operations such as jig boring, was to provide multiple machines so that rather than wait during the machining time, an operator could move from machine-to-machine loading them. This requirement that the operator move from machine-to-machine which uses operator time and can present safety hazards. In some environments, it is also undesirable to have an operator away from an operating machine, loading another machine, where a malfunction may not be detected in time to prevent serious damage to the workpiece or the machine. Therefore, there has been a need to provide workpiece retention means which can be installed on lathes and other metal cutting machines and which allow quick and accurate loading for fast machining.

BRIEF DESCRIPTION OF THE PRESENT INVENTION

The present clamp chuck retains workpieces between a stationary tool plate and a movable clamping plate. The clamping plate is drawn toward the tool plate by a pair of rods which are in turn connected to a hydraulic draw bar in a CNC lathe, similar draw bars in other material forming machines, or an auxiliary hydraulic or pneumatic cylinder. The draw bar is adjustably connected to the rods by means of a swiveling lever plate retained to the draw tube by a threaded, length adjusting, fastener and a pivot bearing. The rods extend through the tool plate and releasably connect to the clamping plate with ball joints. These allow the clamping plate to change angular orientation with respect to the tool plate by movement with respect to the rods. Differential movement of the rods due to the swiveling of the lever plate when the clamping plate is drawn up on an irregular part provides the remaining degree of freedom needed.

When the clamp chuck is to be used, a workpiece to be machined is placed on orienting pins which extend outwardly from the tool plate. The clamping plate is then placed thereover and through the use of twist locking slots, is locked onto the ball ends of the rods. The draw tube is then actuated, drawing the clamping plate down on the workpiece and squeezing it against the tool plate to positively locate it for machining. Since the clamping plate normally is retained at two small areas, the clamping plate may be of various sizes and configurations to allow access by a cutting tool to the portion of the workpiece to be machined. Normally, access is provided by means of a hole through the center of the clamping plate.

Therefore it is a principle object of the present invention to provide means for easily and accurately retaining irregular workpieces in a CNC lathe for machining.

Another object is to provide a clamp chuck which is adaptable to many different metal cutting machines for use in machining irregular workpieces.

Another object is to provide a clamp chuck which is relatively economical to manufacture, which can be adjusted to varying conditions, and which can withstand the harsh high speed production machine shop environment.

Another object is to enable fast, accurate, and economical machining.

These and other objects and advantages of the present invention will be come apparent to those skilled in the art after considering the following detailed Specification together with the accompanying drawings wherein:

DETAILED DESCRIPTION OF THE SHOWN EMBODIMENT

Figure 1:
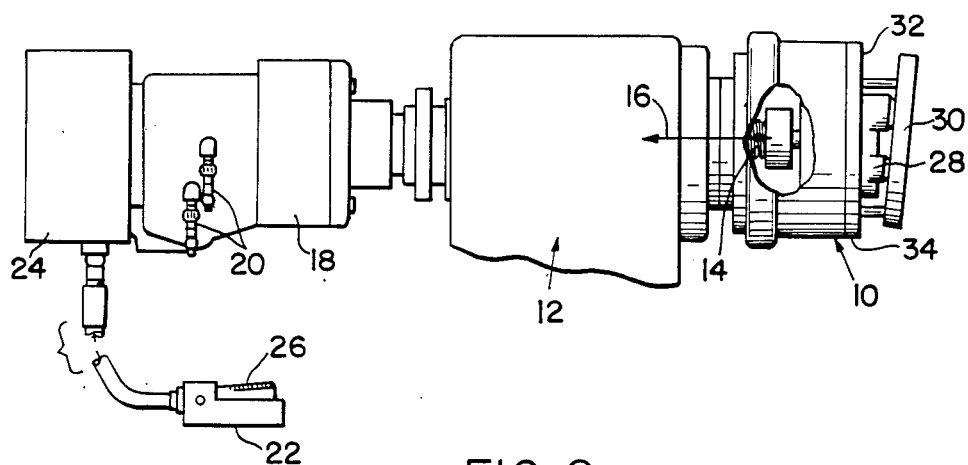
FIG. 1 is a partial side elevational view of a CNC lathe having the chuck of the present invention installed thereon.
Figure 2:
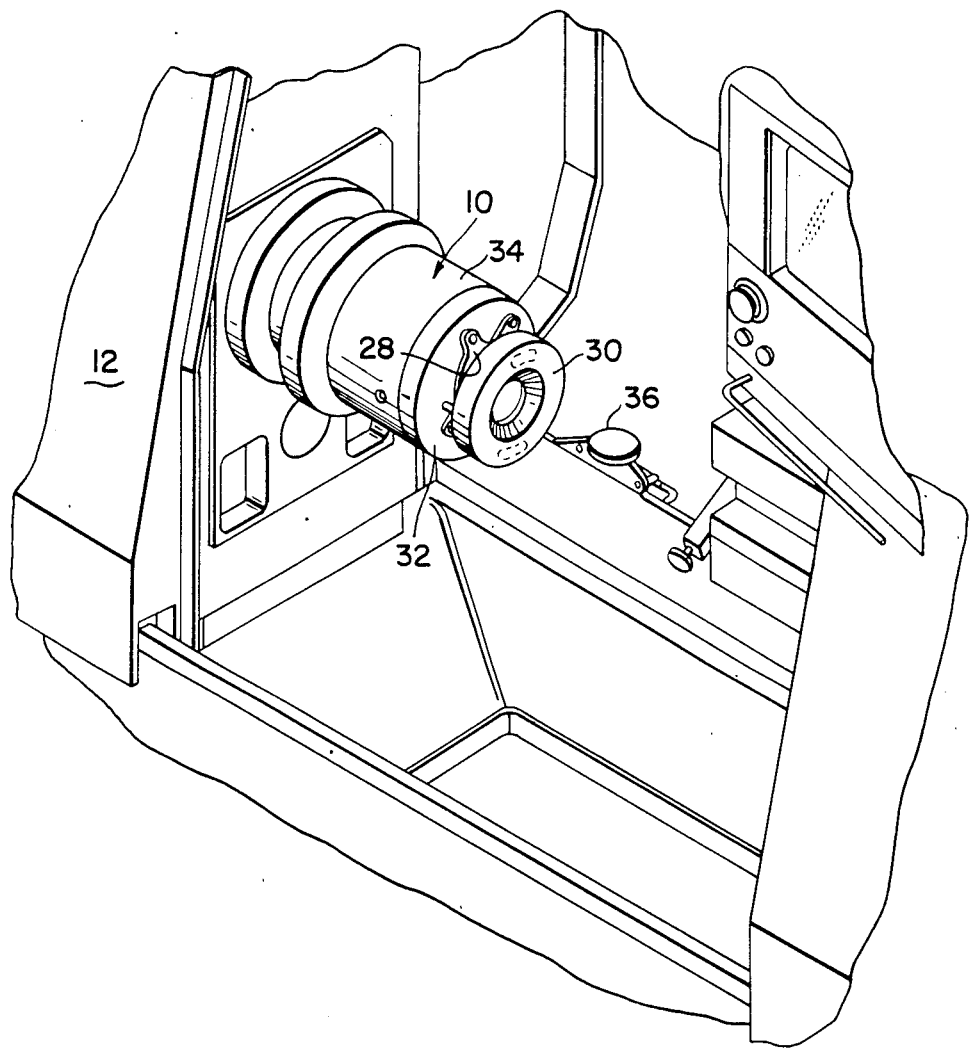
FIG. 2 is a perspective view of the lathe and chuck of FIG. 1, holding a workpiece to be machined.

Referring to the drawings more particularly by reference numbers, number 10 in FIG. 1 refers to a clamp chuck constructed according to the present invention installed on a lathe 12 having a draw tube 14 forcefully actuated for movement in the direction of arrows 16 by means of a hydraulic cylinder 18 connected thereto. The hydraulic cylinder 18 is powered by hydraulic lines 20 and controlled by a foot treadle apparatus 22 through an electric control box 24. Usually, the treadle apparatus 22 is spring loaded so that when its treadle lever 26 is not being stood upon, the draw arm 14 is forced to the left in the orientation of FIG. 1. This causes the clamp chuck 10 to draw up on a workpiece 28, by moving a clamp plate 30 toward the fixed surface 32 of a tool plate 34. As shown in FIG. 2, the clamp plate 30 is ring shaped. However, clamp plates may be constructed in any suitable shape which allows the cutting tool access for machining the workpiece 28.

Figure 3:
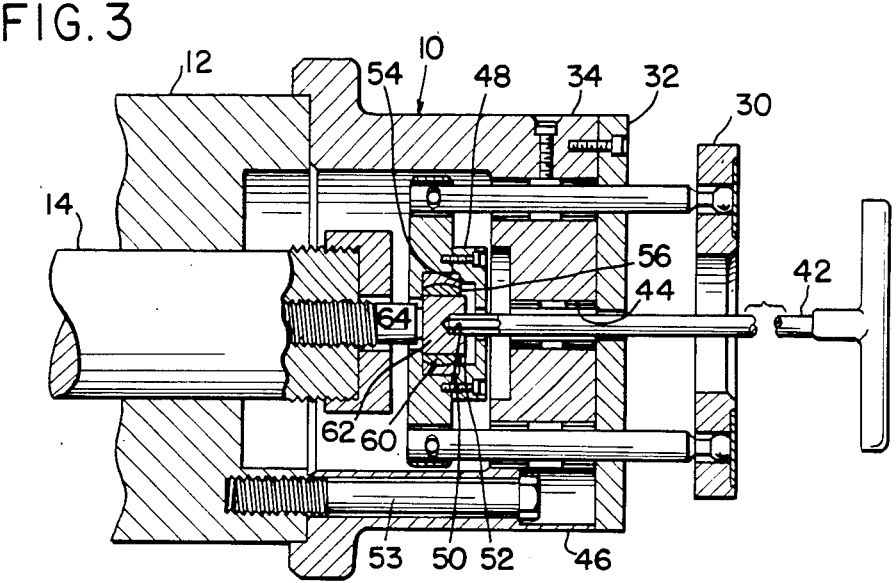
FIG. 3 is a side cross-sectional view of the chuck of the present invention being adjusted.

The clamp chuck 10 is shown in greater detail in FIG. 3. The draw tube 14 is connected to the clamp chuck 10 by means of a special bolt 38 and an adapter 39, the bolt threadably engaging with a threaded hole 40 in the draw tube 14. The bolt 38 can be turned with respect to the draw tube 14 so that its connecting distance can be adjusted. This is done by inserting a key 42 through the clamp plate 30, the tool plate 34, a central orifice 44 in the body 46 of the clamp chuck 10, and a bearing retaining plate 48 until it engages a socket 50 in the head 52 of the bolt 38. The body 46 is adapted to fit on the lathe 12 or other machine tool and is retained by suitable fasteners 53.

Figure 4:
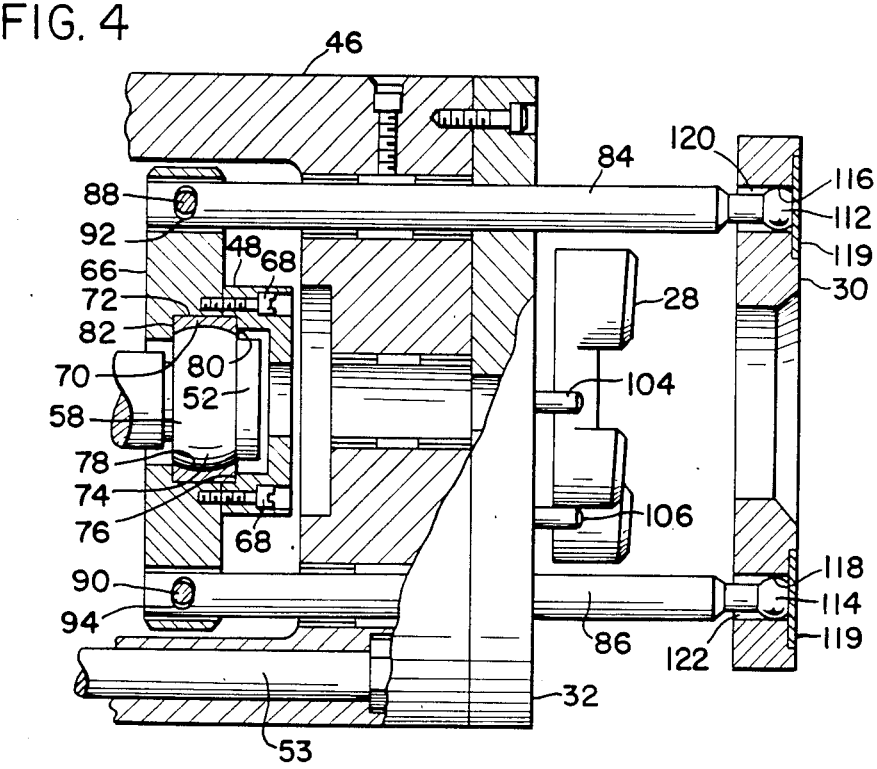
FIG. 4 is a partial cross-sectional view of the chuck of FIG. 3 with a workpiece to be machined placed therein.

The bolt 38 has an abutment surface 54 under its head 52 which engages the side surface 56 of the spherical member 58 of a spherical bearing 60. The bolt 38 also includes an enlarged shank portion 62 which fits within the inner bore 64 of the spherical member 58 so that it can twist therewith when adjustments are being made to the bolt 38 with the key 42. As shown in FIG. 4, the bearing retaining plate 48 is itself retained to a lever plate 66 by a plurality of screws 68. The lever plate 66 and the connected bearing retaining plate 48 include a common internal bore 70 which mates with the outer cylindrical surface 72 of the outer race member 74 of the spherical bearing 60. This keeps the lever plate 66 centered on the bearing 60. The bearing retaining plate 48 and the lever plate 66 each include ring-shaped abutment surfaces 76 and 78 respectively which bear on the sides 80 and 82 of the outer race member 74 and retain it therebetween. Therefore, the lever plate 66 moves horizontally with the draw tube 14 yet can pivot through small angles with respect thereto.

Figure 5:
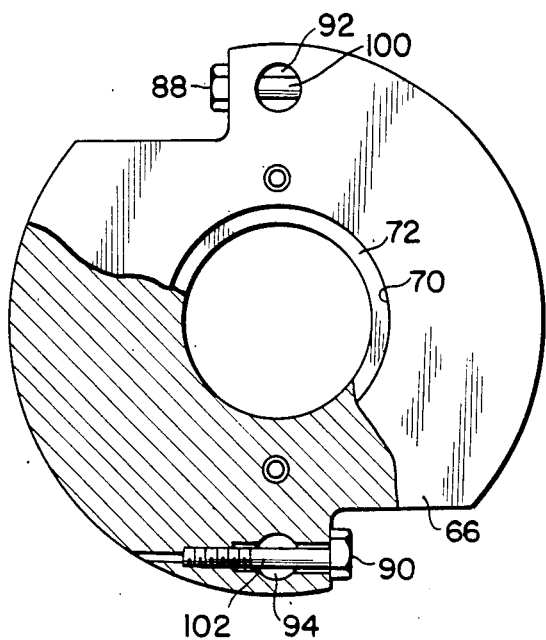
FIG. 5 is a partial cross-sectional elevational view of the lever plate of the present invention.
Figure 6:
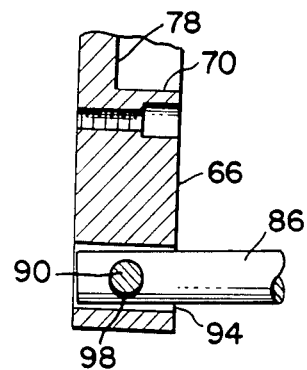
FIG. 6 is an enlarged detailed view of the lever plate, pull rod interface.

As shown in FIGS. 5 and 6, two pull rods 84 and 86 are connected to the lever plate 66 by pin bolts 88 and 90 respectively which extend crosswise through orifices 92 and 94 in the lever plate 66. The rods 84 and 86 extend within the orifices 92 and 94, and the pin bolts 88 and 90 extend through crosswise slots 96 and 98 in the rods 84 and 86. The orifices 92 and 94 are slightly larger than the outer diameter of the rods 84 and 86 and the slots 96 and 98 are slightly larger across the rods 84 and 86 at generally a right angle to the lever plate 66 than the shanks 100 and 102 of the pin bolts 88 and 90 so that a small amount of angular motion can be tolerated between the lever plate 66 and the pull rods 84 and 86.

Figure 7:
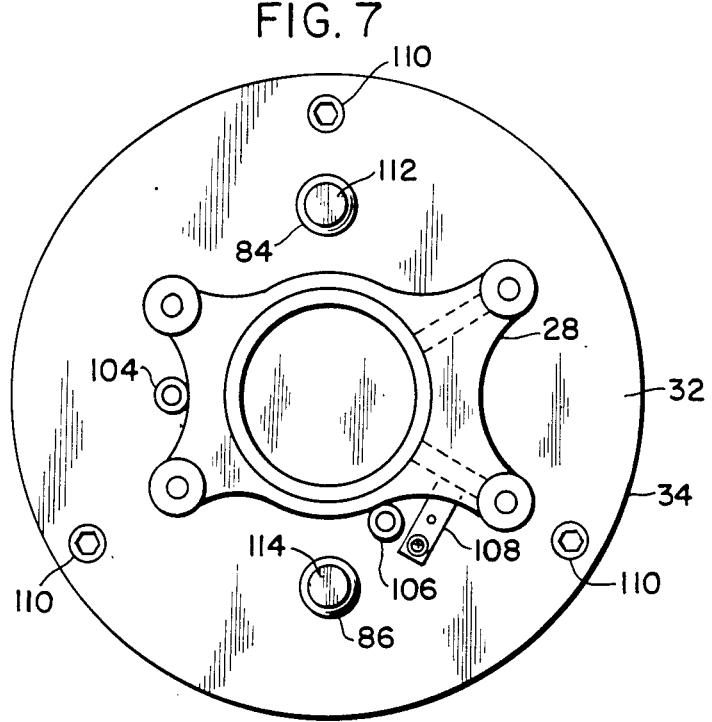
FIG. 7 is an front elevational view of the tool plate of the present invention with the workpiece positioned thereon and the clamping plate removed.

When it is desired to load the chuck 10, the clamp plate 30 may or may not be removed and, as shown in FIG. 7, the workpiece 28 is positioned on suitably spaced alignment pins 104 and 106 and an alignment lever 108. The pins 104 and 106 and the lever 108 are shown for illustrative purposes only and any suitable positive positioning devices can be used in association with the tool plate 34. Since the tool plate 34 is retained to the body 46 by removable cap screws 110, it is relatively easy to install a different tool plate for each workpiece 28 to be machined with the chuck 10. Tool plates 34 can be manufactured at low cost since they are merely turned plates with a few alignment pins located thereon. Once the workpiece 28 is located on the pins 104, 106 and lever 108, the clamping plate 30 is attached to the rods 84 and 86.

Figure 8:
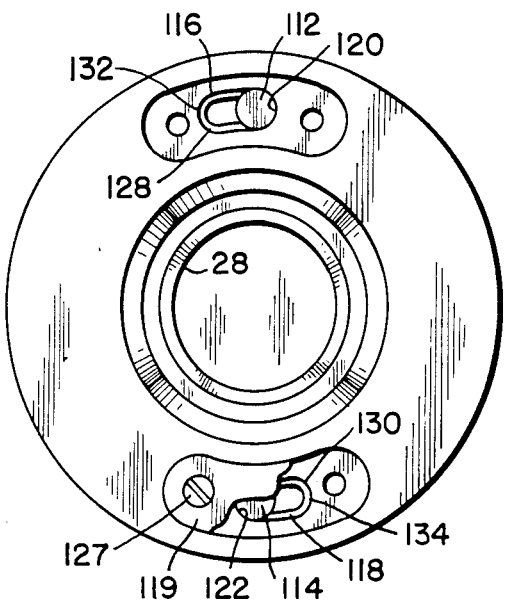
FIG. 8 is a front elevational view of the clamping plate of FIG. 4.
Figure 9:
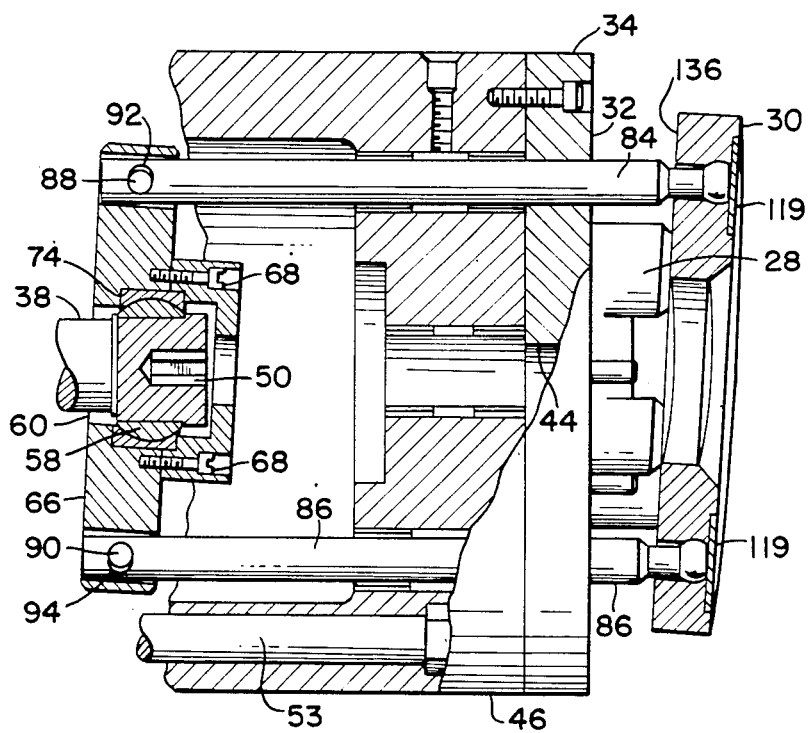
FIG. 9 is a side, partial cross-sectional view of the clamp of FIG. 3 in closed position retaining the workpiece.

The rods 84 and 86 each have a semi-spherical knob 112 and 114 respectively on their ends. As shown in FIG. 8, the clamping plate 30 includes a pair of slots 116 and 118. The slots 116 and 118 each include a cover plate 119, and a cylindrical hole 120 or 122 at one end 124 or 126 respectively thereof. The cylindrical holes 120 and 122 allow the knobs 112 and 114 to be extended through the clamping plate 30 until their passage is blocked by the cover plates 119. The cover plates 119 are retained by suitable fasteners 127. Slot ridges 128 and 130 are included on the other ends 132 and 134 of the slots 116 and 118 so that in the orientation of FIG. 8, a clockwise twist applied to the plate 30 locks the rods 84 and 86 to the clamping plate 30 but the knobs 112 and 114 and the ridges 128 and 130 allow slight angular movements with respect thereto. Therefore, when the draw tube 14 energizes the chuck 10, the clamping plate 30 moves to squeeze the workpiece 28 between its inner surface 136 and the outer surface 32 of the tool plate 34.

As shown in FIG. 8, the knobs 112 and 114 allow angular movement in all directions between the clamping plate 30 and the rods 84 and 86 while the lever plate 66 and the spherical bearing 60 allow pivoting movement of the plate 30 with respect to the draw tube 14. The workpiece 28 securely fastened in the chuck 10 then is machined, and once the machining is completed, the treadle lever 26 is depressed allowing the draw tube 14 to move to the right. This releases the clamp up between the clamping plate 30 and the tooling plate 34, allowing the clamping plate 30 to be twisted counterclockwise to release it from the rods 84 and 86. Thereafter, the workpiece 28 can be removed and another workpiece 28 loaded into the chuck 10.

Thus there has been shown and described a novel clamping chuck which fulfills all the objects and advantages sought therefor. Many changes, modifications, variations and other uses and applications of the subject invention will however become apparent to those skilled in the art after considering this Specification and the accompanying drawings. All such changes, modifications, alterations and other uses and applications which do not depart from the spirit and scope of the invention are deemed to be covered by the invention which is limited only by the claims which follow.

What is claimed is:

1. A chuck assembly for retaining a workpiece in a machine tool during a machining operation including:
   a tool surface;
   a clamp member having a clamp surface thereon facing said tool surface, said tool and clamp surfaces being adapted for retaining a workpiece therebetween; and
   means for moving said clamp surface with respect to said tool surface, said means for moving including:
   a connection member adapted for connection to a source of linear movemment;
   a lever member having:
   a first edge portion;

a second edge portion; and
a central portion;
first pivot means connecting said central portion of said lever member to said connection member;
at least two tension members, each having:
 a first end; and
 a second end;
second pivot means connecting said first ends of said at least two tension members to said first and second edge portions of said lever member; and
third pivot means operatively connecting said second ends of said at least two tension members to said clamp surface.

2. The chuck assembly as defined in claim 1 further including:
a body adapted for connection to the machine tool, said clamp member being connected to said second ends of said at least two tension members by said third pivot means; and
a tool member releasably connected to said body, said tool member having said toll surface thereon.

3. The chuck assembly as defined in claim 2 wherein said at least two tension members extend through said tool member.

4. The chuck assembly as defined in claim 3 wherein said third pivot means include:
at least two twist lock slots extending from said clamp surface formed in said clamp member; and
semi-spherical knobs on said second ends of said at least two tension members which are sized to engage with said at least two twist lock slots when said semi-spherical knobs are inserted in said twist lock slots and said clamp member is twisted with respect to said semi-spherical knobs.

5. The chuck assembly as defined in claim 4 wherein said at least two twist lock slots each include:
a cylindrically shaped bore which extends from said clamp surface into said clamp member into which a semi-spherical knob can extend; and
a horse shoe shaped ridge which extends at generally a right angle to said cylindrically shaped bore, said horse shoe shaped ridge including:
 a curved surface adapted to engage a semi-spherical knob.

6. The chuck assembly as defined in claim 5 wherein said first pivot means connecting said central portion of said lever member to said connection member includes:
a spherical bearing having:
 an outer race engaged with said central portion of said lever member; and
 an inner race engaged with said connection member.

7. The chuck assembly as defined in claim 6 wherein said connection member includes:
an adjustment fastener having:
 a threaded end for adjustable engagement with the source of linear movement; and
 a shank and adjacent head for engagement with said inner race of said spherical bearing.

8. The chuck assembly as defined in claim 7 wherein said head of said adjustment fastener includes:
means for torque transferring engagement, and wherein said tool plate and said body include:
a common torque application tool passageway to allow access to a torque application tool to said means for torque transferring engagement.

9. The chuck assembly as defined in claim 8 wherein said second pivot means connecting said first ends of said at least two tension members to said first and second edge portions of said lever member include:
a transverse slot in said each of said first ends of said at least two tension members;
a first orifice for receiving said first end of one of said at least two tension members located at said first edge portion of said lever member;
a second orifice for receiving said first end of another of said at least two tension members located at said second edge portion of said lever member;
a first pin connected to said lever member extending through said first orifice and said transverse slot of said one of said at least two tension members; and
a second pin connected to said lever member extending through said second orifice and said transverse slot of said other of said at least two tension members.

10. The chuck assembly as defined in claim 9 wherein said tension members are rods having a first diameter at said first ends thereof, and said first and second orifices have a second inner diameter larger than said first diameter.

11. The chuck assembly as defined in claim 5 wherein said at least two twist lock slots each include:
a cover plate over said cylindrical shaped bore to restrict movement of said semi-spherical knobs therethrough.

12. The chuck assembly as defined in claim 1 wherein said first pivot means connecting said central portion of said lever member to said connection member includes:
a spherical bearing having:
 an outer race engaged with said central portion of said lever member; and
 an inner race engaged with said connection.

13. The chuck assembly as defined in claim 12 wherein said connection member includes:
an adjustment fastener having:
 a threaded end for adjustable engagement with the source of linear movement;
 a shank; and
 a adjacent head, said shank and adjacent head engaging said inner race of said spherical bearing.

14. The chuck assembly as defined in claim 13 wherein said head of said adjustment fastener includes:
a socket for transferring torque thereto.

15. The chuck assembly as defined in claim 1 wherein said second pivot means connecting said first ends of said at least two tension members to said first and second edge portions of said lever member include:
a transverse slot in said each of said first ends of said at least two tension members;
a first orifice for receiving said first end of one of said at least two tension members located at said first edge portion of said lever member;
a second orifice for receiving said first end of another of said at least two tension members located at said second edge portion of said lever member;
a first pin connected to said lever member extending through said first orifice and said transverse slot of said one of said at least two tension members; and
a second pin connected to said lever member extending through said second orifice and said transverse slot of said other of said at least two tension members.

16. The chuck assembly as defined in claim 15 wherein said tension members are rods having a first diameter at said first ends thereof, and said first and second orifices have inner diameters larger than said first diameter.

17. The chuck assembly as defined in claim 16 further including:
    - a body adapted for connection to the machine tool, said clamp member being connected to said second ends of said at least two tension members by said third pivot means; and
    - a tool member releasably connected to said body, said tool member having said tool surface thereon.

18. The chuck assembly as defined in claim 17 wherein said at least two tension members extend through said tool member and move with respect thereto.

19. The chuck assembly as defined in claim 1 wherein said third pivot means include:
    - at least two twist lock slots extending from said clamp surface formed in said clamp member; and
    - semi-spherical knobs on said second ends of said at least two tension members which are sized to engage with said at least two twist lock slots when said semi-spherical knobs are inserted in said twist lock slots and said clamp member is twisted with respect to said semi-spherical knobs.

20. The chuck assembly as defined in claim 19 wherein said at least two twist lock slots each include:
    - a cylindrical bore which extends from said clamp surface into said clamp member through which a semi-spherical knob can extend; and
    - a horse shoe shaped ridge which extends generally at a right angle to said cylindrical bore, said horse shoe shaped ridge including:
        - a curved surface adapted to engage a semi-spherical knob.

21. A chuck assembly for retaining a workpiece during a machining operation in a machine tool which includes means for providing axial movement, said chuck assembly including:
    - a tool surface;
    - a clamp member having:
        - a clamp surface facing said tool surface, said tool and clamp surfaces being adapted for retaining a workpiece therebetween; and
    - means for moving said clamp surface with respect to said tool surface, said means for moving including:
        - a lever member having:
            - a first edge portion;
            - a second edge portion; and
            - a central portion;
        - first pivot means adapted for connecting said central portion of said lever member to the means for providing axial movement of the machine tool;
        - at least two tension members, each having:
            - a first end; and
            - a second end;
        - second pivot means connecting said first ends of said at least two tension members to said first and second edge portions of said lever member; and
        - third pivot means operatively connecting said second ends of said at least two tension members to said clamp surface.

* * * * *